(12) United States Patent
Myers

(10) Patent No.: US 7,143,417 B2
(45) Date of Patent: Nov. 28, 2006

(54) NOTIFICATION SERVICES WITHIN A UNIFIED COMMUNICATIONS SERVICE

(75) Inventor: Andrew Myers, Wayland, MA (US)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 10/041,570

(22) Filed: Jan. 10, 2002

(65) Prior Publication Data

US 2003/0131143 A1    Jul. 10, 2003

(51) Int. Cl.
*G06F 9/44*    (2006.01)

(52) U.S. Cl. ............... 719/318; 719/312; 709/213

(58) Field of Classification Search ........... 719/318, 719/310, 312; 709/202, 213; 707/1, 104.1; 710/260

See application file for complete search history.

(56) References Cited

U.S. PATENT DOCUMENTS

| | | | | |
|---|---|---|---|---|
| 5,404,532 A * | 4/1995 | Allen et al. | ........... | 726/22 |
| 5,566,337 A * | 10/1996 | Szymanski et al. | ........... | 710/260 |
| 5,592,664 A * | 1/1997 | Starkey | ........... | 707/1 |
| 5,724,589 A * | 3/1998 | Wold | ........... | 719/318 |
| 5,838,969 A * | 11/1998 | Jacklin et al. | ........... | 719/318 |
| 5,925,108 A * | 7/1999 | Johnson et al. | ........... | 719/318 |
| 6,073,165 A * | 6/2000 | Narasimhan et al. | ........... | 709/206 |
| 6,094,681 A * | 7/2000 | Shaffer et al. | ........... | 709/224 |
| 6,366,926 B1 * | 4/2002 | Pohlmann et al. | ........... | 707/104.1 |
| 6,446,136 B1 * | 9/2002 | Pohlmann et al. | ........... | 719/318 |
| 6,519,686 B1 * | 2/2003 | Woodring et al. | ........... | 711/147 |
| 6,766,368 B1 * | 7/2004 | Jakobson et al. | ........... | 709/224 |
| 6,829,770 B1 * | 12/2004 | Hinson et al. | ........... | 719/318 |
| 7,076,527 B1 * | 7/2006 | Bellegarda et al. | ........... | 709/206 |
| 2002/0010804 A1 * | 1/2002 | Sanghvi et al. | ........... | 709/318 |
| 2002/0019886 A1 * | 2/2002 | Sanghvi et al. | ........... | 709/318 |
| 2002/0042847 A1 * | 4/2002 | Takats et al. | ........... | 709/316 |
| 2003/0105801 A1 * | 6/2003 | Tse et al. | ........... | 709/202 |
| 2005/0044554 A1 * | 2/2005 | Hinson et al. | ........... | 719/318 |
| 2005/0071849 A1 * | 3/2005 | Hinson et al. | ........... | 719/315 |

OTHER PUBLICATIONS

Malowidzki "Advanced event filtering approach for CORBA-based management systems" 2000 IEEE, pp. 47-58.*
Al-Shaer "Event filtering framework: key criteria and design trade-offs" 1997 IEEE, pp. 88-93.*

* cited by examiner

*Primary Examiner*—William Thomson
*Assistant Examiner*—Van Nguyen
(74) *Attorney, Agent, or Firm*—Pillsbury Winthrop Shaw Pittman LLP

(57) ABSTRACT

A system and method for providing notification of significant events such as received or disposed of messages in a unified communication services network. Notifications are event based and may be filtered according to predetermined criteria. One or more event managers may, among other things, manage the receipt and dispersal of event notifications and pass the notifications to one or more notification handlers for dispersal of the notifications to subscribers.

20 Claims, 3 Drawing Sheets

NOTIFICATION SERVICES WITHIN A UNIFIED COMMUNICATIONS SERVICE

FIELD OF THE INVENTION

The present invention relates to systems and methods for providing event driven notification services within a unified communications service.

BACKGROUND OF THE INVENTION

Unified communications services (UCS) are known. Typically, these services comprise a number of networked application processes that provide voice, text, data, messaging, and other communications services to one or more subscribers. For example, application processes such as electronic mail (email), voice mail, instant messaging, document management databases and other database processes, may all be networked in a UCS to enable subscribers to communicate and otherwise share information.

One drawback of existing UCS systems is that notification services (e.g., alerting a subscriber that a voice message is waiting, or the like) operate using some type of polling architecture. For example, each subscriber may create a subscriber profile that contains a number of criteria pertaining to how notification services are to deliver alerts. The system will periodically poll through the profiles to determine whether alerts should be sent. Under a polling system it is necessary to either poll frequently to ensure that alerts are timely sent, or accept a delay (defined by the polling cycle time) in sending alerts. Either scenario may be less than desirable.

Another drawback of existing systems is that notification services often do not provide for filtering, or do not provide for multi-level filtering, of notification alerts. Thus, processing of notification alerts can be inefficient.

Another drawback of existing systems is that the notification services are often not extensible to new or additional application processes. Under such systems implementing new or additional application processes over the UCS network is problematic or, even worse, impossible.

Other drawbacks, such as an inherent lack of scalability and duplicated notification mechanisms for different events, exist with present systems.

SUMMARY OF THE INVENTION

The present invention provides a scalable solution for real-time notification of significant events to one or more handlers for dispersal to interested parties or applications. The invention enables immediate subscriber notification of received messages that meet particular criteria, and supports immediate updates of message waiting indicators on subscriber telephones. In addition, the invention provides extensibility to notifications of arbitrary events, defined by participating applications, multi-level filtering of raised events for time critical performance, support for multiple handlers to receive notifications of different events, or the same events with perhaps different filtering criteria, per-subscriber configuration of notification handlers and filters, automated registration and de-registration of event managers with availability advertising, traceability of event notifications from source to disposition and extensibility to other UCS environments.

Some benefits of this invention are the scalability offered by an event-driven, rather than polling, architecture, customization by per-subscriber configuration, and the support for multiple handlers of the various events. Thus, one subscriber may chose an Instant Messaging notification of received urgent e-mails from a specified set of senders, and a pager notification of received messages referencing a given project, whilst another subscriber on the same system may chose a short messaging service (SMS) message when a particular voice message has been received.

In some embodiments the invention enables the above, and other, features by recognizing significant events occurring within a database, such as a subscriber's mail file, performing a first level filtering against the subscriber's event profiles, creating and submitting one or more notifications for targeted applications in a well-defined format, and dispatching these notifications to notification handlers for (optional) second level filtering and dispersal.

The invention consists of several components, which work in unison to provide the these capabilities. At the core is an event manager which is responsible for managing the registration and de-registration of notification handlers, providing real-time awareness of currently registered notification handlers, receipt of notifications of events, and dispersal of these events to the one or more interested applications. Event notifications are passed between the generating application processes, the event manager, and the notification handlers via in-memory queues.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a filler understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
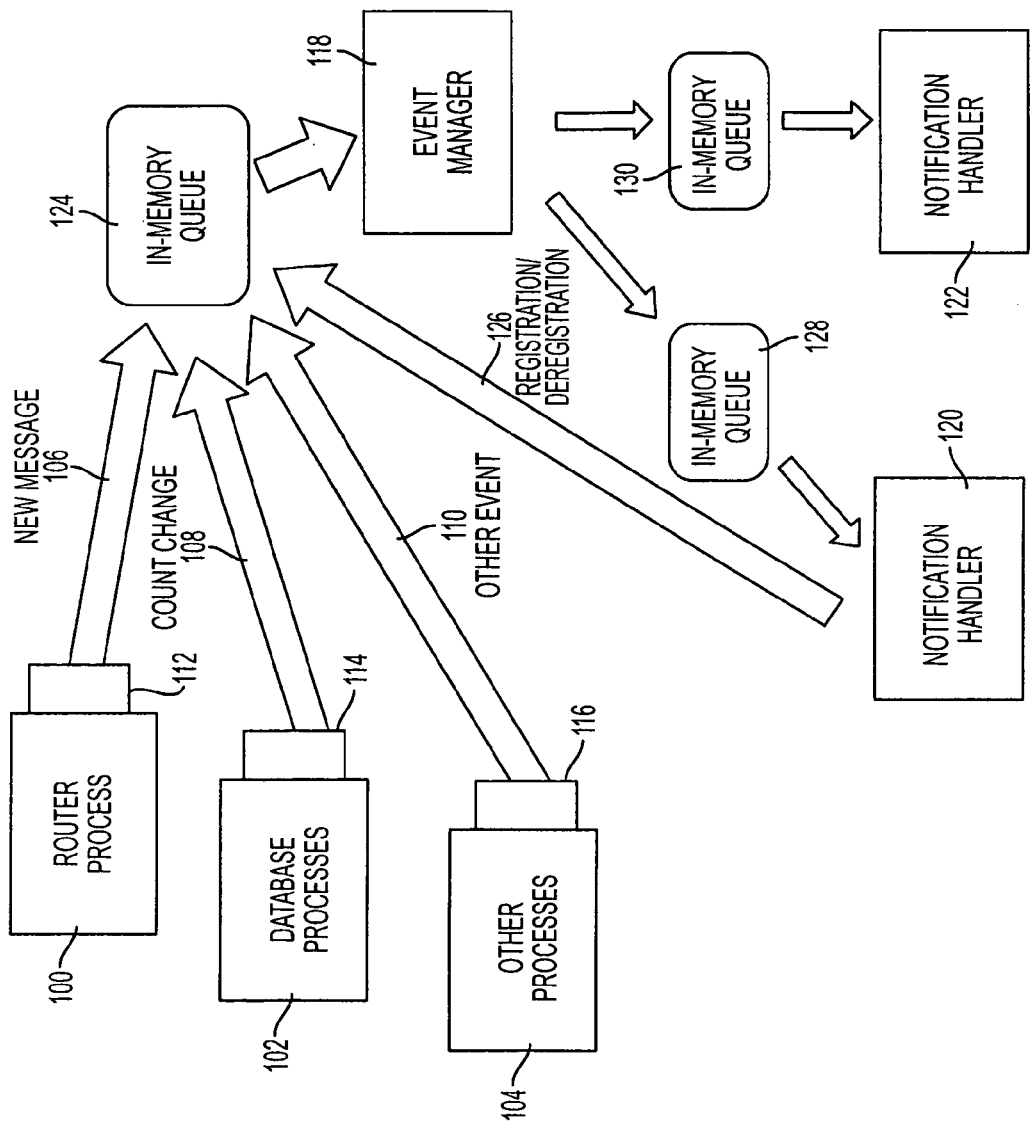
FIG. 1 is a schematic system diagram according to some embodiments of the invention.

FIG. 1 is a schematic representation of system architecture according to one embodiment of the invention. A number of application processes may be combined to comprise a UCS. The application processes may include router processes 100 (e.g., message delivery of email, voice mail, facsimiles, etc.), database processes 102 (e.g., email client access, document management systems, data storage, etc.) and other processes 104 (e.g., calendaring, scheduling, etc.).

Application processes may communicate over any suitable network. For example, the application processes may communicate over a local area network (LAN), wide area network (WAN), a wireless network, a satellite network, an intranet, an extranet, the Internet, or other network.

As discussed above, application processes may comprise various communication (e.g., email, voice mail, facsimile, etc.), document management, database client access, or other processes used in conjunction with a UCS network. The operation of each application process on the UCS network may raise an associated event that is generated for predetermined occurrences.

Events may comprise any occurrence that may be used to trigger a notification to a subscriber. For example, an event may comprise a receipt of a new message in a subscriber's electronic mail file, an indication of a voicemail message in a subscriber's voice server file, reading of a previously unread message in a mail file, moving a message from the Inbox of a mail file, a posting of a new version of a document stored in a document management system, an electronic invitation to a meeting, or the notice of rescheduling of an existing meeting, or other event that occurs for other application processes.

FIG. 1 shows a new message event 106 associated with router process 100. A count change event 108 may be associated with database process 102. Other events 110 may be associated with other processes 104.

In some embodiments, event filters may be used to perform a first level filtering. For example, event filters may be used to check if an event meets predefined criteria (e.g., message type, message priority level, etc.). Event filters may also be used to check whether appropriate event managers are available (e.g., is email program running, is text paging available, etc.).

Event filters may be executed at the application process level, and may comprise different filters for each application process, but would most normally be identical for all processes raising the same event. For example, FIG. 1 shows a router event filter 112 associated with router process 100, a database event filter 114 associated with database processes 102 and an other event filter 116 associated with other processes 104. Other embodiments may implement similar event filters for all application processes.

Notification of events (e.g., 106, 108, 110) generated by the application processes (e.g., 100, 102, 104) are passed to event manager 118. Event manager 118 is, among other things, an intermediary between application processes (e.g., 100, 102, 104) that generate notification of events (e.g., 106, 108, 110) and notification handlers (e.g., 120, 122) that receive and dispose of these event notifications.

In addition, event manager 118 may comprise a registration manager to maintain and advertise a list of currently registered notification handlers (e.g., 120, 122) so that the application process (e.g., 100, 102, 104) that generates the event (e.g., 106, 108, 110) may determine whether any notification handler (e.g., 120, 122) is available to dispose of the event.

Event manager 118 may perform its functions in any suitable fashion. For example, event manager 118 may maintain a list of currently registered notification handlers in a well-known area of shared memory, which only it will update, but which other application processes may query. Event manager 118 may also create an in-memory queue 124 into which event generating application processes (e.g., 100, 102, 104) submit notifications of events (e.g., 106, 108, 110), and notification handlers (e.g., 120, 122) submit registration and deregistration requests (e.g., 126). Alternatively, the above functions may be accomplished using the underlying file system or other suitable method.

As mentioned above, the system may include any number of notification handlers (e.g., 120, 122). A notification handler comprises an application running on a server which, among other things, registers for, and receives, various event notifications from the event manager (e.g., 118).

In some embodiments, notification handlers (e.g., 120, 122) may receive sufficient information within events (e.g., 106, 108, 110) to perform, if desired, a second level filtering on the event and dispose of the event according to the second level filtering. For example, an Instant Messaging notification handler may receive a new message event notification for a subscriber (i.e., after first level filtering by an event filter), determine that the new message contents meet the subscriber's configuration (i.e., second level filtering), and, if the subscriber is on-line (i.e., via awareness capabilities of the Instant Messaging service, and, thus, a possible third level filtering), send an Instant Messaging notice to them with details of the message, such as sender and subject (i.e., dispose of the event).

As another example, a Paging notification handler may receive a meeting change event notification for a subscriber (i.e., after first level filtering by an event filter), determine that the meeting change contents meet the subscriber's configuration (i.e., second level filtering) and send a Paging message to the subscriber's pager with details of the meeting, such as new time and location (i.e., dispose of the event).

In some embodiments, notification handlers (e.g., 120, 122) may create their own in-memory queue (e.g., 128, 130) from which they receive event notifications. In addition, notification handlers (e.g., 120, 122) may register with the event manager (e.g., 118) by passing a notification handler identifier, such as a text string and a reference to the respective in-memory queue (e.g., 120, 122).

Enabling the notification handlers (e.g., 120, 122) to register with the event manager (e.g., 118) provides handler awareness to the application processes that raise the events, and provides the support for multiple notification handlers within the architecture. Furthermore, the use of handler identifiers extends this support for multiple, distinct handlers.

Figure 2:
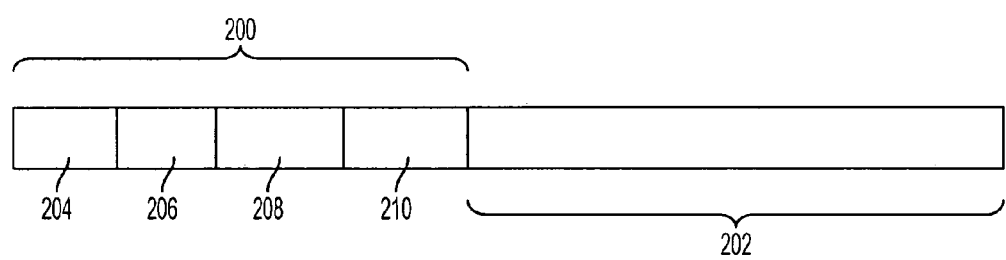
FIG. 2 is a schematic representation of an event notification format according to some embodiments of the invention

FIG. 2 is a schematic representation of an event notification format according to some embodiments of the invention. As shown, an event notification may comprise a header 200 and event data 202.

In some embodiments header 200 information may be standardized. For example, a header 200 may comprise a format version number 204, a sequence number 206 (which may be used for tracking purposes), an event type indicator 208, and a notification handler identifier (HandlerID) 210. As noted above, HandlerID 210 may comprise a text string or other suitable identifier.

HandlerID 210 may be used by the event manager (e.g., 118) to dispatch received events appropriately. Anonymous handlers are enabled by the use of empty strings for a HandlerID 210.

In addition, there is no requirement that HandlerID 210 be unique. If more than one notification handler registered with the same HandlerID 210, then an event received by event manager 118 quoting that same HandlerID 210 will be passed on to all the notification handlers that registered with that same HandlerID 210.

Event data 202 may vary depending on the nature of the event and application process. If an event is to be passed on to multiple notification handlers (e.g., 120, 122) (with different HandlerIDs 210), then multiple event notifications may be generated (i.e., one for each HandlerID 210) by the application process.

Figure 3:
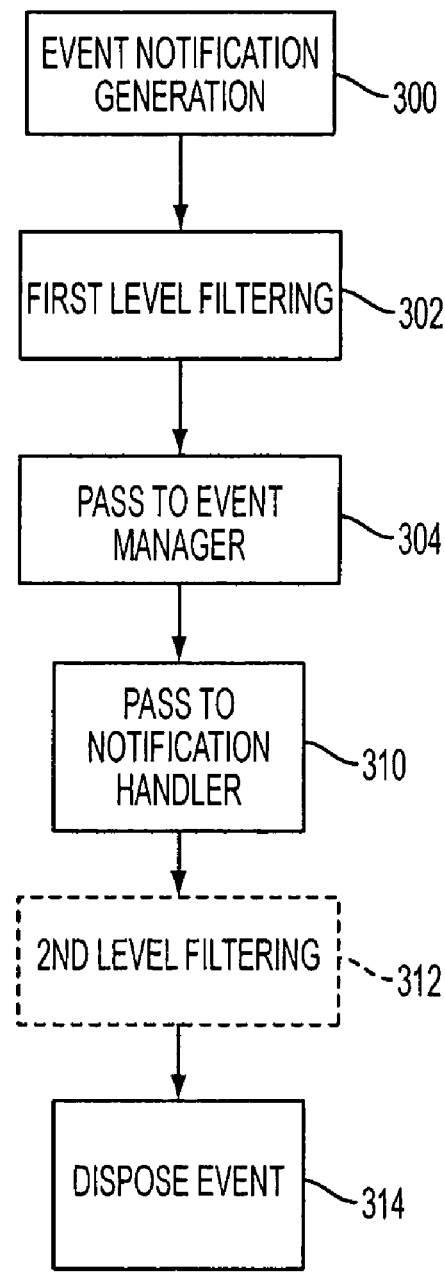
FIG. 3 is a schematic flow diagram illustrating a method for providing notification services according to some embodiments of the invention.

FIG. 3 is a schematic flow diagram illustrating a method for providing notification services according to some embodiments of the invention. As shown, the method initiates with event notification generation 300. As discussed above, generation of event notification may occur in any suitable fashion and may depend upon the underlying application process.

First level filtering may be provided as indicated at 302. As discussed above, first level filtering maybe enabled by one or more event filters (e.g., 112, 114, 116).

Event notification may then pass to the event manager (e.g., 118) as indicated at 304. The event manager (e.g., 118) may advertise the presence of notification handlers (e.g., 120, 122), and the availability of a suitable notification handler (e.g., 120, 122) may be checked in an event filter (e.g., 112, 114, 116) (i.e., first level filtering).

If an appropriate notification handler (e.g., 120, 122) is not registered, then no event will be passed on by the application process executing the event filter (e.g., 112, 114, 116). If an appropriate notification handler is registered, event manager 118 may pass the event notification to a notification handler (e.g., 120, 122) as indicated at 310.

In some embodiments, an optional second filtering may occur as indicated at 312. As described above, second level filtering may comprise filtering at a message content level, presence/awareness of the recipient of the notification, disposal mechanism determined by the time of day (e.g., no telephone calls after 8:00 pm), or some other appropriate filtering.

The event is disposed of by notification handler (120, 122) as indicated at 314. Disposal may be accomplished in any suitable manner. For example, disposal may be accomplished by sending a page, by using SMS, by sending an Instant Message, by placing a telephone call, by invoking an application on the subscriber's desktop, or some other suitable disposal method.

Some features of the invention may be described with reference to the following exemplary embodiment operating within the Lotus Domino Unified Communications Service (DUCS) environment. While these features are described with reference to this particular UCS, the invention is not so limited and these features are understood to be available in any UCS implementing the present invention.

In some embodiments of DUCS, there are two specific events of significance: New Message Alerts and Inbox Count changes (which drive Message Waiting Indicators). A New Message Alert is generated whenever a message is delivered to an enabled mail file. Handler configurations may filter this event by message type (voice, fax, e-mail) and priority, so that notifications may be sent only for the specific messages requested by the subscriber. Along with the standard notification header items, the New Message Alert notifications will have the following data: application data (optional), source database, database owner, new message type and priority, message identifier, message sender and subject.

An Inbox Count Change event is raised whenever the count of specific messages in the mail file Inbox changes. This allows for external display of key contents of the Inbox, such as new voice messages (the typical attribute of message waiting indicators in traditional or legacy voice mail systems). The present invention may be used to track the contents of any specific folder in a mail file (e.g., the Inbox). Along with the standard notification header items, the New Message Alert notifications will have the following data: application data (optional), source database, database owner, message count in the folder.

The following advantages of the present invention are described in view of the above description of exemplary embodiments of the invention.

The present invention is extensible to notifications of arbitrary events, defined by participating application processes. The above described system supports event messages of varying format, so long as they contain the specified header. A new event would simply need to define its own event type, have a notification handler register for that event type, and the event manager would pass on notifications.

The present invention is extensible to multi-level filtering of generated events for time critical performance. The system supports filtering at various levels in the flow. The original application processes that generated the events perform preliminary filtering, via an event filter, based, for example, on message type and priority in the quoted examples. If an event meets such filters for any particular handler (defined by its HandlerID), then the advertising of available notification handlers by the event manager may provide the second level of filtering. Finally, the notification handler may do its own, application specific filtering before disposal of the event. This hierarchy of filtering, where the coarsest and quickest filtering happens in the originating process, and the finest, most detailed, filtering may happen in the notification handler, is advantageous to time-critical performance. It is anticipated that most potential events will be filtered out early on during the most time critical processes.

The present invention provides support for multiple handlers to receive notifications of different events, or the same events with, perhaps, different filtering criteria. As described, the event manager 118 supports multiple notification handlers (e.g., 120, 122), divided by the event types in which they are interested, and their own HandlerID 210. The system supports multiple handlers receiving the same events. For example, multiple applications may respond to New Message alerts, each with their own message filtering based on different HandlerIDs.

The present invention enables per-subscriber configuration of notification handlers and filters. The model used in DUCS provides per-subscriber filters queried by the generating events, so that different users may set different criteria for notifications of the same events. As an example, one user may wish their Message Waiting indicator to reflect new voice messages, whereas another may wish it to reflect new voice and fax messages.

The present invention enables automated registration and de-registration of event managers with availability advertising. As described above, event manager 118 may accept notification handler registrations, and advertises their availability to event raising processes via shared memory.

The present invention provides traceability of event notifications from source to disposition. The inclusion of a sequence number 206 in event messages, as defined in the standard header 200, allows tracking from inception to (possibly multiple) dispersals.

The invention is extensible to any suitable environment. The system may readily be used, in part or in whole, within any environment that enables different events to be raised, traced, and dispatched to multiple handlers, with high levels of granularity in configuration, and premium performance.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A system for providing notification of events in a unified communications services network the system comprising:
    a network that provides unified communications services to users that enable the users to share information, the unified communications services comprising application processes;
    an event filter in communication with an event generating application process, wherein the event filter performs a first level filtering of notification of an event generated by the event generating application process;
    an event manager that receives the notification of the event from the event filter over the network, and disperses the event over the network; and
    a notification handler that receives the notification of the event over the network and disposes of the event,
    wherein the notification handler performs a second level filtering of notification of the event, and
    wherein the notification handler performs the second level filtering of notification of the event by determining whether contents of the event meet second level filtering criteria established by a user, and communicating the event to the user if the contents of the event meet the second level filtering criteria associated with the user.

2. The system of claim 1 wherein the first level filtering is performed based on an event type of the event.

3. The system of claim 1 wherein the first level filtering is performed based on a priority level for the event.

4. The system of claim 1 further comprising a plurality of event generating application processes and a plurality of notification handlers, and the event manager further comprises:
    a registration manager that manages registration of the plurality of notification handlers, and provides awareness of registered notification handlers to at least one of the plurality of event generating application processes.

5. The system of claim 4 wherein the registration manager maintains a list of currently registered notification handlers in a shared memory and wherein the plurality of event generating application processes may query the list of currently registered notification handlers.

6. A method for providing notification of events in a unified communications services network the method comprising:
    providing unified communications services to users that enable the users to share information over a network, the unified communications services comprising application processes;
    enabling an event filter, in communication with an event generating application process, to perform a first level filtering of notification of an event generated by the event generating application process;
    passing the notification of the event over the network from the event filter to an event manager that receives and disperses the event over the network;
    passing the notification of the event over the network to a notification handler that receives the notification of the event and disposes of the event, and
    enabling the notification handler to perform a second level filtering of notification,
    wherein performing the second level filtering of notification of the event includes determining whether contents of the event meet second level filtering criteria established by a user, and communicating the event to the user if the contents of the event meet the second level filtering criteria associated with the user.

7. The method of claim 6 wherein the first level filtering is performed based on an event type of the event.

8. The method of claim 6 wherein the first level filtering is performed based on a priority level for the event.

9. The method of claim 6 wherein the unified communications services network further comprises a plurality of event generating application processes and a plurality of notification handlers, and the method further comprises:
    enabling the event manager to manage registration of the plurality of notification handlers, and provide awareness of registered notification handlers to at least one of the plurality of event generating application processes.

10. The method of claim 9 further comprising:
    maintaining a list of currently registered notification handlers in a shared memory and wherein the plurality of event generating application processes may query the list of currently registered notification handlers.

11. A system for providing notification of events in a unified communications services network the system comprising:
    a network that provides unified communications services to users that enable the users to share information over the network, the unified communications services comprising application processes;
    event filter means for communicating with an event generating application process, wherein the event filter means performs a first level filtering of notification of an event generated by the event generating application process;
    event manager means for receiving the notification of the event over the network from the event filter means, and dispersing the event over the network; and
    notification handler means for receiving the notification of the event over the network and disposing of the event,
    wherein the notification handler means performs a second level filtering of notification of the event, and
    wherein the notification handler means performs the second level filtering of notification of the event by determining whether contents of the event meet second level filtering criteria established by a user, and communicating the event to the user if the contents of the event meet the second level filtering criteria associated with the user.

12. The system of claim 11 wherein the first level filtering is performed based on an event type of the event.

13. The system of claim 11 wherein the first level filtering is performed based on a priority level for the event.

14. The system of claim 11 further comprising a plurality of event generating application processes and a plurality of notification handler means, and the event manager means further comprises:

registration manager means for managing registration of the plurality of notification handler means, and provides awareness of registered notification handler means to at least one of the plurality of event generating application processes.

15. The system of claim 14 wherein the registration manager means maintains a list of currently registered notification handler means in a shared memory and wherein the plurality of event generating application processes may query the list of currently registered notification handler means.

16. A processor readable medium having process readable code embodied therein for enabling a processor to provide notification of events in a unified communications services network the processor readable medium comprising;

processor readable code for providing unified communications services to users that enable the users to share information over a network, the unified communications services comprising application processes;

processor readable code for enabling an event filter, in communication with an event generating application process, to perform a first level filtering of notification of an event generated by the event generating application process;

processor readable code for passing the notification of the event over the network from the event filter to an event manager that receives and disperses the event over the network;

processor readable code for passing the notification of the event over the network to a notification handler that receives the notification of the event and disposes of the event; and processor readable code for enabling the notification handler to perform a second level filtering of notification of the event, wherein performing the second level filtering of notification of the event includes determining whether contents of the event meet second level filtering criteria established by a user, and communicating the event to the user if the contents of the event meet the second level filtering criteria associated with the user.

17. The processor readable medium of claim 16 wherein the first level filtering is performed based on an event type of the event.

18. The processor readable medium of claim 16 wherein the first level filtering is performed based on a priority level for the event.

19. The processor readable medium of claim 16 wherein the unified communications services network further comprises a plurality of event generating application processes and a plurality of notification handlers, the processor readable medium further comprises:

processor readable code for enabling the event manager to manage registration of the plurality of notification handlers, and provide awareness of registered notification handlers to at least one of the plurality of event generating application processes.

20. The processor readable medium of claim 19 further comprising:

processor readable code for maintaining a list of currently registered notification handlers in a shared memory and wherein the plurality of event generating application processes may query the list of currently registered notification handlers.

* * * * *